F. T. RILEY.
RADIATOR.
APPLICATION FILED MAY 11, 1914.
1,123,380.
Patented Jan. 5, 1915.
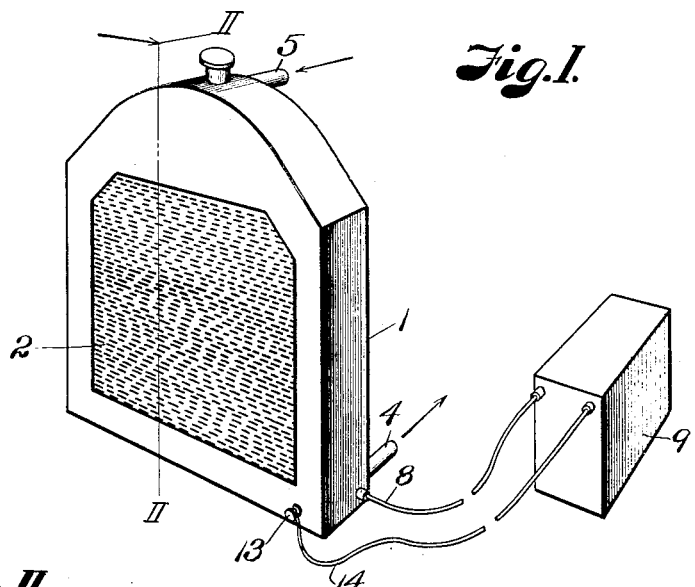
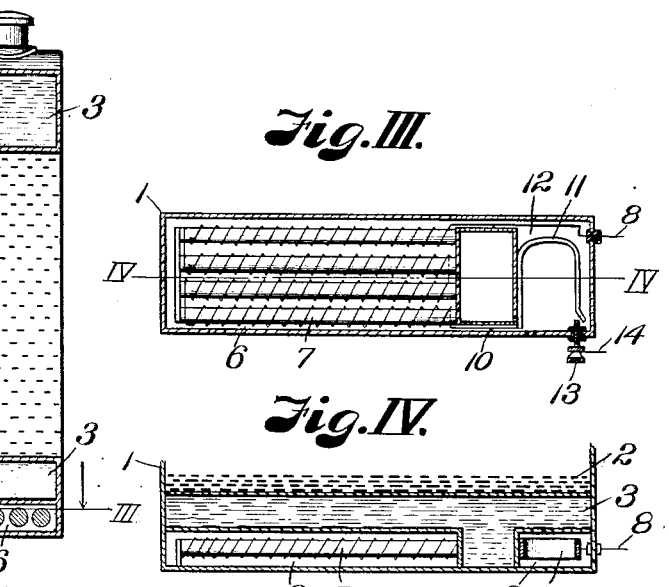
WITNESSES:
Arthur W. Caps.
Lynn A. Robinson.
INVENTOR
F. T. Riley.
BY Arthur C. Brown.
ATTORNEY

UNITED STATES PATENT OFFICE.

FRANK T. RILEY, OF KANSAS CITY, MISSOURI.

RADIATOR.

1,123,380. Specification of Letters Patent. Patented Jan. 5, 1915.

Application filed May 11, 1914. Serial No. 837,741.

*To all whom it may concern:*

Be it known that I, FRANK T. RILEY, a citizen of the United States, residing at Kansas City, in the county of Jackson and State of Missouri, have invented certain new and useful Improvements in Radiators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to radiators, and more particularly to a radiator for use in connection with and adapted for cooling the water that circulates through the jacket of an explosive engine; the principal object of the present invention being to provide means for heating water in the radiator, and a thermostatic controlling device whereby the heater is automatically started in operation when the water in the radiator has reached a determined temperature. In accomplishing this object, I have provided improved details of structure, the preferred forms of which are illustrated in the accompanying drawings, wherein:—

Figure I is a perspective view of a radiator equipped with a heater constructed in accordance with my invention. Fig. II is a vertical section of the radiator on the line II—II, Fig. I. Fig. III is a horizontal section on the line III—III, Fig. II, illustrating the preferred form of heater and thermostat. Fig. IV is a vertical section on the line IV—IV, Fig. III.

Referring more in detail to the parts: 1 designates a radiator of any ordinary construction, but here shown to be of a type commonly used in connection with automobiles, and comprising an air flue 2, and an inclosing water channel 3, having pipes 4 and 5 leading respectively to and from the water jacket of an engine (not shown).

Located within a chamber 6 that is set into the lower portion of the water channel 3, is a heating device, here shown to comprise a resistance coil 7 having a terminal 8 leading through the radiator to a storage battery 9, and a second terminal 10 connected with a thermostat 11, which is preferably located in a chamber 12 that projects into the lower portion of the water channel 3, but is spaced from the heater chamber, in order that the thermostat may be affected by variations of temperature of the circulating water and not directly by that of the heater.

The thermostat is preferably U-shaped, as shown, with its free end located adjacent but normally spaced from the end of a variable contact screw 13, which also serves as a binding post, and is connected with the battery 9 by a wire 14, so that variations in temperature of the circulating water may easily cause the free end of the thermostat to expand or contract to open or close a circuit through the resistance coil.

By having the binding post adjustably mounted, the contact end may be set toward or from the thermostat to vary the point of contact, so that a circuit through the heating coil may be closed at a predetermined temperature.

In using the device, presuming the parts to be constructed and assembled as described, with the thermostat set for a temperature of, say forty degrees, should the water in the radiator become chilled to that extent, the thermostat will contract until it contacts the binding post, and thereby close a circuit through the coil and battery, so that the coil is energized and heats the water within the radiator. When the water has become heated, the thermostat is expanded in the higher temperature until it breaks its contact with the binding post and again opens the circuit to the battery and shuts off the flow of current to the heating coil.

It is apparent that with a heater of this kind, the control of the temperature is automatic and that the heater may be set to operate at any given temperature by manipulation of the binding post, so that a car may be left standing in very cold weather without danger of the radiator freezing, and so that the heater may be set to operate at any given temperature that will best serve the cooling requirements of the engine.

Having thus described my invention, what I claim as new therein, and desire to secure by Letters-Patent, is:

1. The combination with a radiator, of a heater, a thermostat in operative relation to the radiator and adapted for controlling the heater and a water chamber between the heater and thermostat.

2. The combination with a radiator, of an electrical heater, means for conducting current to the heater, including a thermostatic device, with the heater in position for furnishing heat to one part of the radiator and the thermostatic device in position for receiving heat from another part of the radiator, and a chamber between the heater and thermostatic device.

In testimony whereof I affix my signature in presence of two witnesses.

FRANK T. RILEY.

Witnesses:
LYNN A. ROBINSON,
L. E. COATS.